Feb. 10, 1970 J. D. KELLER ET AL 3,495,207

WIRE TERMINALS

Original Filed July 9, 1965

INVENTORS
JOSEPH D. KELLER
WILLIAM J. MIDDLETON JR.
BY Julian C. Renfro
ATTORNEY

United States Patent Office 3,495,207
Patented Feb. 10, 1970

3,495,207
WIRE TERMINALS

Joseph D. Keller, Winter Park, and William J. Middleton, Jr., Orlando, Fla., assignors to Martin-Marietta Corporation, Middle River, Md., a corporation of Maryland Continuation of application Ser. No. 470,695, July 9, 1965. This application May 28, 1968, Ser. No. 740,779
Int. Cl. H01r 5/00, 15/12
U.S. Cl. 339—223 14 Claims

ABSTRACT OF THE DISCLOSURE

An electrical wire connector apparatus to improve the connection of the end of an insulated wire to a printed circuit board. A tubular body has holes in one or both ends for inserting wires and a window located in the side of the tubular body to expose an uninsulated portion of a wire end for soldering the wire to the tubular body and for inspecting the soldered joint. The connector has means for attaching it to a printed circuit board.

This is a continuation of our application entitled "Wire Terminals," Ser. No. 470,695, filed July 9, 1965, now abandoned.

This invention relates to a novel wire terminal, and more particularly to an electrical wire terminal adapted to be attached to the end of a wire or cable to enable the creation of highly satisfactory electrical connections with a printed circuit board, chassis, connector block, or the like.

Well-known terminals of the bifurcated, perforated, turret and hook types used heretofore have required a tinned wire end which is wrapped on the terminal with pliers. This wrapped connection, unfortunately, tends to create a solder wicked wire while soldering the connection to the terminal. A solder wicked wire is of course one in which the solder has by capillary attraction run along the wire prior to solidifying, thereby making the wire vulnerable to fracture when the solder wicked portion of the wire strand is flexed.

Accordingly, a primary object of the present invention is to provide a novel wire terminal which effectively eliminates the fracture problem of a solder wicked wire.

Another commercially available terminal has a sleeve into which a stripped insulated wire end can be inserted. The sleeve is crimped to the insulation of the inserted wire, and the uninsulated portion of the wire extends through the sleeve to be soldered to a lug extending from the sleeve. This lug is then used to fasten the terminal to a circuit board or chassis by inserting it through a slit, twisting and soldering it. This type of terminal however is not generally adaptable for machine soldering and has no means for stopping the wire from being inserted past a desired point. It also cannot generally be made with a prejoint for continuity checking and electrical testing, and does not provide versatility in the type of fastening means used.

The novel wire terminal of this invention has an elongated body with fastening means for fastening the terminal to a printed circuit board or the like. The elongated body has holes disposed in it for inserting the insulated and uninsulated portions of stripper wire ends that are to be connected to the body. The wire is prevented from being inserted past a preselected point either by the bottom of the hole receiving the wire or by an annular ledge within the hole for blocking the insulated portion of the wire. The body advantageously has port holes in its side large enough for viewing a section of the inserted wire, and for access to the wire while joining the wire to the terminal.

Depending on the specific intended usage, the terminal may be mounted on the circuit board in a variety of ways, and the wires to be connected to the circuit board rapidly and dependably attached without the danger of fracture from the wicking of solder along such wires.

These and other objects and advantages of the present invention will be apparent from the following detailed description, and from the claims, taken in connection with the accompanying drawings in which:

Figure 1:
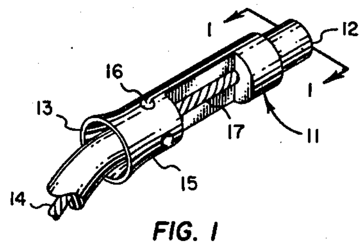
FIGURE 1 is a perspective view of a first embodiment of the present invention showing the physical arrangement of the terminal and wire end.
Figure 2:
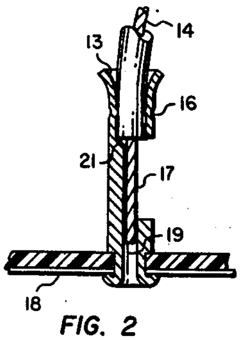
FIGURE 2 is a cross sectional view of the terminal of FIGURE 1 taken along the plane 1—1 of FIGURE 1 and shown connected to a printed circuit board.

Referring now in detail to FIGURES 1 and 2 of the drawings, terminal 11 of conductive material will be noted to be formed in an elongated, generally cylindrical configuration, and to have fastening means 12 at one end. An opening 13 at the other end may be funneled for receiving the end of a piece of stripped insulated stranded electrical wire 14. The wire insulation support 15 is provided to support the wire insulation and for dampening vibration, and may include optional crimping anchors 16 for crimping and holding the insulated portion of wire 14 to the terminal 11 prior to soldering the wire to the terminal.

The aperture 17 provided in accordance with this invention allows the stripped portion of the inserted insulated wire to be attached to the terminal, such as by soldering, and to be readily inspected after the connection is accomplished. In the present embodiment the hole for receiving the stranded conductive wire extends the length of the terminal 11, so that upon fastening the terminal to a printed circuit board 18 (FIGURE 2), machine or wave soldering may be accomplished through the opening 19 in end 12 to mechanically and electrically secure the wire to the terminal. Whereas wave soldering is generally accomplished through the bottom opening 19, under certain circumstances it may be desirable to wave solder through the aperture 17. This latter method could be used to advantage on terminals mounted on a connector block. For multiple rows of terminals, each row could be soldered prior to the wire assembly of the next row in front of the aperture. The chamfered edge 21 of the terminal prevents the insulated portion of the stripped wire 14 from being inserted into the aperture 17.

It should be observed at this point, that while "roll over" type fastening means 12 is shown with this embodiment, any fastening means, such as a male plug or female receptacle, may be used to secure the terminal to the mounting means without departing from the spirit and scope of the invention. It should also be noted that the invention may be made without the crimping anchors 16.

In practical operation, the stripped end of an insulated stranded wire is inserted into the funnel shaped opening 13 until the insulation is stopped by the chamfered edge 21. The insulated portion is then anchored by crimping the anchors 16, and then the stranded wire portion is soldered to the terminal at the aperture 17, or wave soldering may be used after the terminal is fastened to a printed circuit board 18. Inspection may then be made at the aperture 17. The fastening of the terminal to the printed circuit board may be accomplished either before or after inserting the wire into the terminal.

The fracture problem of a solder wicked wire is eliminated since that portion of the wire subject to being solder wicked is not flexed, but is held rigid by the wire insulation support 15. Thus joint reliability is not effected if a wire becomes solder wicked while being soldered to the terminal.

Figure 3:
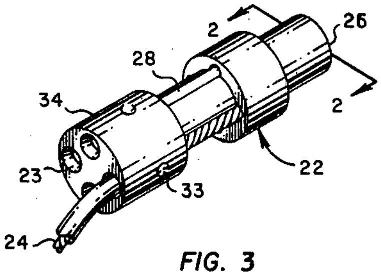
FIGURE 3 is a perspective view of a second embodiment of the present invention.
Figure 4:
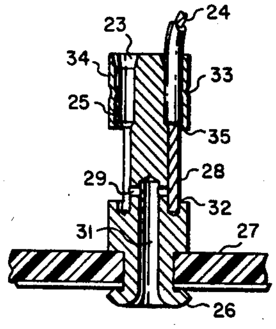
FIGURE 4 is a cross-sectional view of the terminal of FIGURE 3 taken along the plane 2—2 of FIGURE 3 shown connected to a printed circuit board.

Referring now in detail to FIGURES 3 and 4, there is shown a perspective and a cross-sectional view of a second embodiment of the present invention. The terminal generally indicated at 22 has at one end four funnel shaped opening 23 for enabling stripped insulated stranded wire 24 to be inserted into holes 25, and at the other end fastening means 26 for attaching the terminal to a printed circuit board 27 (FIGURE 4). Aperture 28 advantageously permits inspection of the joint after connecting a wire to the terminal. Holes 29 connected to central hole 31 allows machine or wave soldering to be used whereby the solder can flow from the bottom of the printed circuit board 27 up to secure the stripped portions of the wires 24 to the terminal.

Individual manual soldering or other means of attaching wire may also be used individually through aperture 28, and the soldering cups 32 may be filled with solder prior to inserting the wire ends and heated upon insertion of the wire to attach the wire prior to completing the join through aperture 28. Optional crimping anchors 33 may also be used on the wire support and vibration dampening section indicated at 34. The chamfered edge 35 as in the previous embodiment stops the insulated portion of the wire end from being inserted past a predetermined point so as not to interfere with soldering the joint.

Whereas this embodiment is shown with four openings for receiving wires, it should be understood that any number of openings may be used commensurate with the wire diameter and the size of the terminal, without departing from the spirit and scope of the invention.

Figure 5:
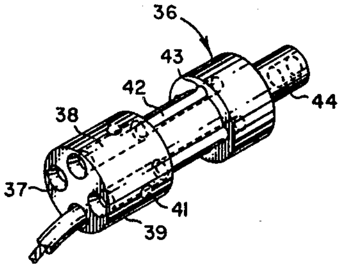
FIGURE 5 is an isometric view of another embodiment of the present invention also showing the physical arrangement of the elements.

Referring now to FIGURE 5, there is shown an isometric view of another embodiment, generally similar to that shown in FIGURES 3 and 4, in which terminal 36 is depicted. Funnel shaped openings 37 of holes 38 are of course provided for the insertion of wires to be connected to the terminal. This embodiment also utilizes vibration dampener 39, optional crimping anchors 41, aperture 42, soldering cups 43, and fastening means 44. This embodiment however does not have the holes similar to holes 29 and 31 of FIGURE 4 necessary for soldering through the fastening means 44, for this embodiment is intended to be machine soldered through the aperture 42 as already discussed in conjunction with FIGURES 1 and 2.

Solder cups 43 may be prefilled with solder so that a prejoint is formed merely by inserting the wire end while heating the terminal in the area of solder cup 43. This provision permits continuity checking and electrical testing of the connection prior to completing the joint. Whereas this prejoint is located inside the solder cup and not visible for inspection, it does permit electrical contact between the wire and terminal. The finished joint can be made by known soldering techniques so as to permit joint inspection through aperture 42. Significantly, individual wires may be attached or removed in this embodiment without affecting the other wires connected to the terminal.

The solder cups 43 may be of any shape desired and may be interconnected to form an annular groove encircling the terminal. The solder cups 43 also may be off-centered with respect to the holes 38. Thus a slight bend in the wire inserted into hole 38 would be required for insertion into the solder cup 43. This would provide electrical contact between the inserted wire and the terminal 36 by the pressure of the bent wire against the side of the solder cup 43.

Figure 6:
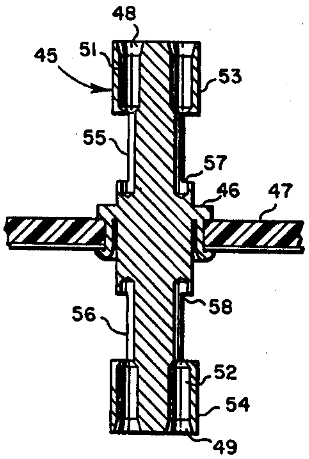
FIGURE 6 is a side view of still another embodiment of the present invention.

Referring now to FIGURE 6 there is shown a side view of an embodiment of the present invention that is typically mounted with the mid-point of its length connected to the circuit board. To this end the terminal has fastening means 46 located approximately midway between the ends of the terminal that enables the terminal to be mechanically fastened to printed circuit board 47. This terminal is advantageously configured to have wire ends inserted into funnel shaped openings 48, 49 of holes 51, 52 located at both ends of the terminal from both sides of the printed circuit board 47.

Wire insulation supports and vibration dampeners 53, 54 are located on both sides of the printed circuit board 47 as are inspection apertures 55, 56 and solder cups 57, and 58. This embodiment is useful when wire leads are terminated on both sides of a printed circuit board or chassis side and obviates the use of separate terminals. While the terminal shown in FIGURE 6 has several openings at either end for receiving wire ends, any number including one such opening at each end, can be used without departing from the scope of the invention.

Figure 7:
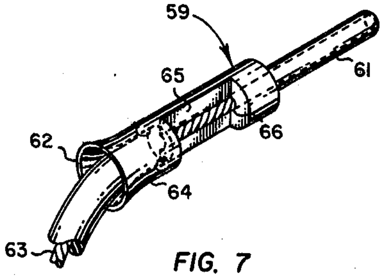
FIGURE 7 is an isometric view of yet another embodiment of the present invention with a solderless tube male plug type fastening means.

Referring now to FIGURE 7 terminal 59 is revealed to be similar to the embodiment shown in FIGURES 1 and 2, but has fastening means 61, illustrated in the form of a solderless type male plug for insertion into a matching hollow receptacle. The terminal has a flared opening 62 in which an insulated wire 63 is inserted, wire insulation support 64, inspection aperture 65 and solder cup 66.

As will be apparent to one skilled in the art, this invention significantly enables the rapid and dependable securing of component wires to a printed circuit board, while at the same time enabling prejoint continuity testing and preventing joint failure resulting from solder wicked wires.

This invention is not to be construed as limited to the particular forms disclosed herein, since these are to be regarded as illustrative rather than restrictive. For instance, the fastening means of the terminal may be of any type desired; the crimping anchors being optional may be left off; the number of holes for inserting wires may be varied as desired; the solder cups may be prefilled with solder or deleted from the structure if desired; the shape, while shown cylindrical, may be varied; the funnel shaped openings, which lessen the flex stress on the inserted wire and makes it easier to insert the wire ends, may also be varied; the bottom of the solder cup may be used to stop the wire being inserted past a desired point and the chamfered edge for blocking the insulation left off, and machine soldering may be accomplished through the openings at one end or through the openings between the ends.

We claim:

1. A terminal for use with an insulated wire, the insulation on the end of which wire has been stripped away to expose some of the center conductor portion, said terminal comprising an elongated body portion having a hole therein to receive a length of the conductor portion of the wire, fastening means at one end of said body portion, means in said body portion preventing insertion of the insulated portion of the wire past a certain point, and an aperture provided in the sidewall of said body portion intermediate the ends of said body portion, said aperture being of elongated configuration and extending depth-wise of said body portion sufficiently to expose said hole as well as a portion of the center conductor of the wire when such conductor has been inserted into said hole, whereby said aperture enables effective soldering of the conductor to said body portion to take place as well as to permit adequate inspection of the resulting solder joint, said body portion being provided with a plurality of holes extending along its length so that a plurality of wires whose ends have been stripped may be accommodated therein.

2. A terminal for use with an insulated wire, the insulation on the end of which wire has been stripped away to expose some of the center conductor portion, said terminal comprising an elongated body portion having a hole therein to receive a length of the conductor portion of the wire, support means at one end of said body portion, means defining in said support means an opening the size of which is such as to receive the insulated portion of the wire when the stripped end has been inserted in said hole, and an aperture provided in the sidewall of said body portion intermediate the ends of said body portion, said aperture extending depth-wise of said body portion sufficiently to expose said hole as well as a portion of the center conductor of the wire when such conductor has been inserted into said hole, whereby said aperture enables effective soldering of the conductor to said body portion to take place as well as to permit adequate inspection of the resulting solder joint, and said support means prevents undesirable flexure of the wire adjacent the location where the insulation on said wire terminates, and fastening means provided in the end of said body portion remoted from said support means, said fastening means being of a configuration to be secured in a circuit board.

3. A terminal for use with an insulated wire, the insulation on the end of which wire has been stripped away to expose some of the center conductor portion, said terminal comprising an elongated body portion having a hole therein to receive a length of the conductor portion of the wire, support means at one end of said body portion, means defining in said support means an opening the size of which is such as to receive the insulated portion of the wire when the stripped end has been inserted in said hole, and an aperture provided in the sidewall of said body portion intermediate the ends of said body portion, said aperture extending depth-wise of said body portion sufficiently to expose said hole as well as a portion of the center conductor of the wire when such conductor has been inserted into said hole, whereby said aperture enables effective soldering of the conductor to said body portion to take place as well as to permit adequate inspection of the resulting solder joint, and said support means prevents undesirable flexure of the wire adjacent the location where the insulation on said wire terminates, said body portion being provided with a plurality of holes extending along its length, as well as having associated support means and apertures so that a plurality of wires whose ends have been stripped may be soldered to said body portion.

4. A terminal for use with an insulated wire, the insulation on the end of which wire has been stripped away to expose some of the center conductor portion, said terminal comprising an elongated body portion through the length of which extends a hole of a size to receive a length of the conductor portion of the wire, support means at one end of said body portion and fastening means at the other end, means defining in said support means an opening, the size of which is such as to receive the insulated portion of the wire when the stripped end has been inserted in said hole, and an aperture provided in the sidewall of said body portion intermediate the ends of said body portion and spaced away from said support means, said aperture being of elongated configuration and extending depth-wise of said body portion sufficiently to expose said hole as well as a portion of the center conductor of the wire when such conductor has been inserted into said hole, whereby said aperture permits adequate inspection of the resulting solder joint, and said support means prevents undesirable flexure of the wire adjacent the location where the insulation on said wire terminates.

5. The terminal as defined in claim 4 in which said fastening means is in the form of a male pin designed to be inserted into a matching hollow receptacle.

6. The terminal as defined in claim 4 in which said fastening means is in the form of a female receptacle.

7. The terminal as defined in claim 4 in which said fastening means is of elongated configuration, and having a size and dimension enabling it to be fitted into and secured in a hole in a circuit board.

8. The terminal as defined in claim 4 in which said body portion is provided with a plurality of holes extending along its length, as well as having associated support means and apertures so that a plurality of wires whose ends have been stripped may be soldered to said body portion.

9. The terminal as defined in claim 4 in which means are provided in said opening for preventing the insection of the insulated portion of the wire past a certain point.

10. An electrical wire terminal for connecting a plurality of stripped ends of insulated wire to printed circuit panels, comprising an elongated body having two ends and fastening means for attaching said body to a printed circuit panel or the like, said body having a plurality of holes in one end thereof extending longitudinally into said elongated body, and adapted to receive a stripped end of insulated wire in each hole, said body having an annular ledge located in each said hole, and said body being configurated to allow access to each said hole at a location between said ends, whereby the insulated and uninsulated portions of a stripped wire end may be inserted into each hole of said body to a point where the beginning of the insulated portion abuts the annular ledge in its respective hole, and whereby each said stripped wire end may be attached to said body between said ends.

11. The wire terminal according to claim 10 in which said body has a plurality of holes in each end thereof extending longitudinally into said elongated body.

12. The wire terminal according to claim 10 in which said body has a plurality of holes in one end thereof, and a single hole in the other end interior of said fastening means, said fastening means being elongated, and sized to be inserted into and secured in a hole in a circuit panel or the like.

13. The wire terminal according to claim 12 in which said single hole in said other end of said body connects with each of said plurality of holes in said one end of said body.

14. The wire terminal according to claim 13 in which said body includes each hole partially filled with solder.

References Cited

UNITED STATES PATENTS

| | | | |
|---|---|---|---|
| 2,856,593 | 10/1958 | Gookin | 339—220 |
| 2,668,279 | 2/1954 | Epstein | 339—103 |

DARRELL L. CLAY, Primary Examiner

U.S. Cl. X.R.

29—626, 628; 174—68.5; 339—17, 275